(12) United States Patent
Kang (10) Patent No.: US 11,359,984 B2
(45) Date of Patent: Jun. 14, 2022

(54) PRESSURE SENSOR WITH IMPROVED DETECTION SENSITIVITY

(71) Applicant: INNER SENSOR CO., LTD., Gyeongsangbuk-do (KR)

(72) Inventor: Moon Sik Kang, Gyeonggi-do (KR)

(73) Assignee: INNER SENSOR CO., LTD., Gyeongsangbuk-do (KR)

( * ) Notice: Subject to any disclaimer, the term of this patent is extended or adjusted under 35 U.S.C. 154(b) by 0 days.

(21) Appl. No.: 17/250,008

(22) PCT Filed: Apr. 26, 2019

(86) PCT No.: PCT/KR2019/005050
§ 371 (c)(1),
(2) Date: Oct. 29, 2020

(87) PCT Pub. No.: WO2019/212198
PCT Pub. Date: Nov. 7, 2019

(65) Prior Publication Data
US 2021/0239557 A1 Aug. 5, 2021

(30) Foreign Application Priority Data
Apr. 30, 2018 (KR) .................. 10-2018-0049615

(51) Int. Cl.
*G01L 9/00* (2006.01)
(52) U.S. Cl.
CPC .......... *G01L 9/0073* (2013.01); *G01L 9/0048* (2013.01)
(58) Field of Classification Search
None
See application file for complete search history.

(56) References Cited

U.S. PATENT DOCUMENTS

| 4,894,698 A * | 1/1990 | Hijikigawa | G01L 9/0098 257/254 |
| 9,634,153 B2 * | 4/2017 | Moon | H04R 23/006 |

(Continued)

FOREIGN PATENT DOCUMENTS

| JP | 05087032 B2 | 9/2012 |
| KR | 1020070004812 A | 1/2007 |

(Continued)

OTHER PUBLICATIONS

International Search Report from PCT Application PCT/KR2019/005050 dated Aug. 1, 2019, 2 pgs.

*Primary Examiner* — Lisa M Caputo
*Assistant Examiner* — Nigel H Plumb
(74) *Attorney, Agent, or Firm* — Patterson Thuente Pedersen, P.A.

(57) ABSTRACT

A pressure sensor is provided that uses an electric field effect. The pressure sensor includes a first electrode extending in a vertical direction and defining a core region, a second electrode disposed to entirely surround the first electrode, a first insulating layer interposed between the first and second electrodes, a ground electrode electrically insulated from the second electrode, the ground electrode being disposed to surround the second electrode and a membrane connected to the ground electrode and positioned to cover the first and second electrodes, and the membrane being provided to generate an electric field in an adjacent region together with the first and second electrodes. The particular arrangements described herein are configured to make the electric field distort when an object approaches thereto, enhancing sensitivity by measuring change in capacitance, pressure, and impedance.

5 Claims, 7 Drawing Sheets

(56) References Cited

U.S. PATENT DOCUMENTS

2009/0066345 A1* 3/2009 Klauk ................ G06K 9/00053
324/661
2014/0054731 A1* 2/2014 Graham ................ B81B 3/0081
257/415

FOREIGN PATENT DOCUMENTS

| KR | 101291745 B1 | 7/2013 |
| KR | 1020150091298 | 10/2015 |
| KR | 1020160002489 A | 1/2016 |

* cited by examiner

PRESSURE SENSOR WITH IMPROVED DETECTION SENSITIVITY

CROSS-REFERENCE TO RELATED APPLICATIONS

This application claims priority under 35 USC § 119 to Korean Patent Application No. 10-2018-0049615 filed on Apr. 30, 2018, the contents of which are herein incorporated by reference in its entirety.

BACKGROUND OF THE INVENTION

1. Field of the Invention

Example embodiments of the present invention relate to a pressure sensor using an electric field effect and a method of manufacturing the same. More particularly, example embodiments of the present invention relate to a pressure sensor for sensing a pressure applied from outside by using an electric field effect, and a method of manufacturing the pressure sensor.

2. Description of the Related Art

A pressure sensor is one of a plurality of sensors, capable of detecting an applied pressure. The pressure sensor is classified into a capacitive pressure sensor and a resistive pressure sensor.

The capacitive pressure sensor may measure the pressure value by sensing a change in capacitance according to a relative position of an object to be tested with respect to a pair of electrodes. At this time, a noise problem may occur due to gas or moisture which may remain between the electrodes. In the mean time, the resistive pressure sensor has a relatively large temperature deviation depending on an operating temperature. Furthermore, when the resistive pressure sensor is of a high pressure type, a bonding process for boding between metal and silicon may be required, and there may be a problem in that a bonding strength and a stability at a bonding surface between different materials may be deteriorated.

SUMMARY OF THE INVENTION

Example embodiments of the present invention provide a pressure sensor using an electric field effect, capable of having a relatively low temperature deviation and an improved sensitivity.

Embodiments of the present invention provide a method of manufacturing a pressure sensor using an electric field effect, capable of having a relatively low temperature deviation and an improved sensitivity.

According to example embodiments, a pressure sensor using an electric field effect includes a first electrode extending in a vertical direction and defining a core region, a second electrode disposed to entirely surround the first electrode, a first insulating layer interposed between the first and second electrodes, a ground electrode electrically insulated from the second electrode, the ground electrode being disposed to surround the second electrode and a membrane connected to the ground electrode and positioned to cover the first and second electrodes, and the membrane being provided to generate an electric field in an adjacent region together with the first and second electrodes, and being configured to make the electric field to distort when an object approaches thereto.

In an example embodiment of the present invention, the pressure sensor may further include a second insulating layer interposed between the second electrode and the ground electrode.

In an example embodiment of the present invention, the ground electrode may have a protrusion portion at an outermost portion thereof, and the protrusion portion may be connected to an outer periphery of the membrane.

In an example embodiment of the present invention, the membrane may include silicon or metal.

In an example embodiment of the present invention, the first and second electrodes and the ground electrode may define a core shell structure.

In an example embodiment of the present invention, the first electrode may include a central portion and a plurality of extension portions extending in a radial direction with respect to the central portion.

According to example embodiments, a method of manufacturing a pressure sensor using an electric field is disclosed. The method includes forming a lower structure including a first electrode extending in a vertical direction and defining a core region, a second electrode disposed to surround the first electrode and generating an electrical field together with the first electrode, a first insulating layer being interposed between the first and second electrodes, and a ground electrode disposed to surround the second electrode, forming an upper structure including a membrane being connected to the ground electrode and being positioned to cover the first and second electrodes, the membrane being provided to form an electric field in an adjacent region together with the first and second electrodes, and to make the electric field to distort when an object approaches thereto, and combining the lower structure with the upper structure.

In an example embodiment of the present invention, forming the lower structure may include forming an epitaxial layer on a substrate, patterning the epitaxial layer to form an electrode pattern, and forming an insulating layer to cover the electrode pattern.

In an example embodiment of the present invention, forming the lower structure may include forming a photoresist pattern on a substrate, performing an electroplating process to form an electrode pattern in an exposed area where an upper surface of the substrate is exposed, removing the photoresist pattern from the substrate, and forming an insulating layer to cover the electrode pattern.

In an example embodiment of the present invention, forming the lower structure may include forming at least one via hole penetrating through a substrate, forming a polysilicon layer in the via hole and patterning the polysilicon layer.

In an example embodiment of the present invention, combining the lower structure with the upper structure may include performing an anodic boding process or an adhesive bonding process.

According to some embodiments of the present invention as described above, the pressure sensor includes a membrane that makes an electric field to distort as an object approaches or makes contact thereto. By measuring a change in capacitance value of a capacitor defined among the first and second electrodes and the membrane, which may occur due to a distorted electric field, a change in distance between the pressure sensor and the object may be detected. A pressure value applied by the object to the membrane may be obtained using the measured change value in distance. Furthermore, by the distorted electric field, a change in impedance or a change in voltage may be measured as well. Thus, the pressure sensor may secure excellent sensitivity.

A hollow is formed between the electrodes and the membrane, and as the hollow is sealed, a noise problem can be suppressed by gas or moisture. In addition, the resistive pressure sensor may effectively solve the problem of temperature deviation depending on the operating temperature.

DESCRIPTION OF THE EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Figure 1:
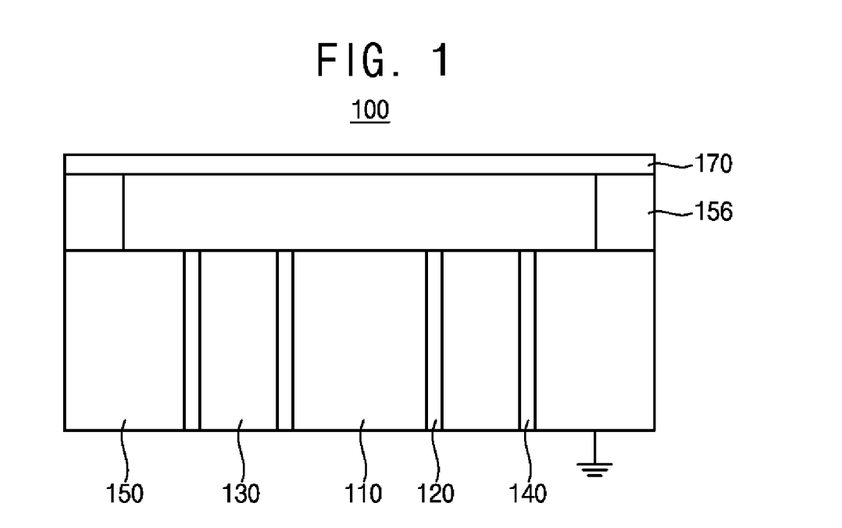
FIG. 1 is a cross-sectional view illustrating a pressure sensor using an electric field effect according to an example embodiment of the present invention.

FIG. 1 is a cross-sectional view illustrating a pressure sensor using an electric field effect according to an example embodiment of the present invention.

Referring to FIG. 1, a pressure sensor 100 using an electric field effect according to an example embodiment of the present invention includes a first electrode 110, a second electrode 130, a first insulating layer 120, a ground electrode 150 and a membrane 170. The pressure sensor 100 using the electric field effect measures a variation in capacitance values caused by distortion phenomena of the electric field when an object approaches or makes contact to the pressure sensor. Accordingly, a pressure may be sensed by measuring a change in distance between the pressure sensor 100 and the object.

The first electrode 110 is provided in a core region of the pressure sensor 100. The first electrode 110 may extend in a vertical direction. The first electrode 110 may be made of a metal or doped polysilicon material.

The second electrode 130 is provided to entirely surround the first electrode 110. That is, the second electrode 130 may be provided along an outer peripheral surface of the first electrode 110. The second electrode 130 may be defined as one electrode of a capacitor having a capacitance together with the first electrode 110.

The second electrode 130 may extend in the vertical direction. The second electrode 130 may be made of a metal or doped polysilicon material. The second electrode 130 may be made of the same material as the first electrode 110.

The first insulating layer 120 is interposed between the first and second electrodes 110 and 130. That is, the first insulating layer 120 electrically insulates the first and second electrodes 110 and 130.

Figure 2:
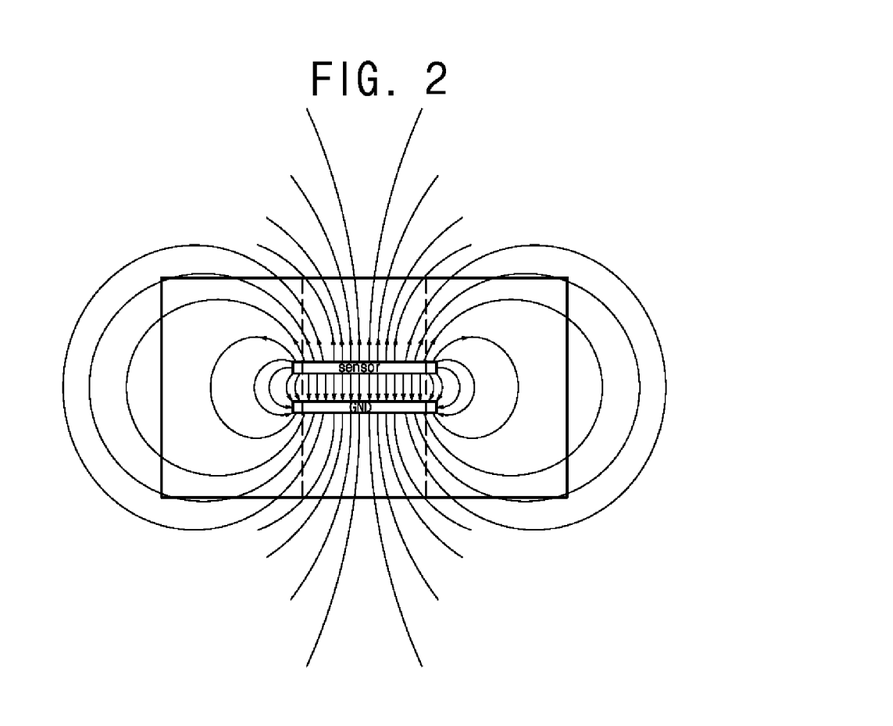
FIG. 2 is a diagram showing the electric field of the pressure sensor of FIG. 1.

FIG. 2 is a diagram showing the electric field of the pressure sensor of FIG. 1.

Referring to FIGS. 1 and 2, the pressure sensor 100 including the first and second electrodes 110 and 130 (depicted as sensor) and a grounded membrane (depicted as GND) generates an electric field in an adjacent region. In other words, when an AC voltage is applied to the first and second electrodes 110 and 130, an electric field generates, and a magnetic flux of constituting the electric field is shown to flow toward the membrane GND. In addition, a fringing effect may occur at both ends of the first and second electrodes in which magnetic flux is bent or spread inside an electromagnet. This time is defined as a steady state electric field.

On the other hand, when an electrically conductive or magnetic object approaches the membrane, distortion occurs with respect to the normal electric field.

Referring again to FIG. 1, the ground electrode 150 is provided to be electrically insulated from the second electrode 130. The ground electrode 150 is provided to entirely surround the second electrode 130. The ground electrode 150 generates an electric field in the adjacent region together with the first and second electrodes.

In addition, the electric field of the ground electrode 150 may be restricted within the adjacent region. That is, the ground electrode 150 may serve as a guard ring so that the ground electrode may prevent the electric field from being distorted, otherwise other member may cause the electric field from spreading to an undesired region.

The membrane 170 is partially connected to the ground electrode 150. Thus, the membrane 170 may be electrically grounded. The membrane 170 is provided to cover the first and second electrodes 110 and 130. In addition, the membrane 170 is provided to be spaced apart from the first and second electrodes 110 and 130. The membrane 170 may cause distortion of the electric field when the object approaches or contacts to the membrane 170. By measuring a change in capacitance values of the capacitor defined by the first and second electrodes 110 and 130 and the membrane 170, which may occur by the distorted electric field, a variation in a distance between the pressure sensor 100 and the object can be detected.

The pressure value applied by the object to the membrane 170 may be measured using a change in distance value. Furthermore, by the distorted electric field, a change in impedance or a change in voltage may be measured together.

The membrane 170 may be made of silicon or metal. Accordingly, the membrane 170 may have semiconductor or conductor properties.

In an example embodiment of the present invention, a second insulating layer 140 interposed between the second electrode 130 and the ground electrode 150 may be additionally provided. The second insulating layer 140 electrically insulates the second electrode 130 from the ground electrode 150.

In an example embodiment of the present invention, the ground electrode 150 may have a protrusion portion 156 disposed at the outermost side. Accordingly, the protrusion portion 156 is connected to the outer periphery of the membrane 170, so that a hollow may be defined along an inner side of the protrusion portion 156. In addition, the protrusion portion 156 electrically connects the ground electrode 150 and the membrane 170 to each other. Accordingly, the membrane 170 may be electrically grounded.

In an example embodiment of the present invention, the first and second electrodes 110 and 130 and the ground electrode 150 may have a core cell structure as a whole. Accordingly, the pressure sensor 100 may have a relatively-wider sensing area.

The pressure sensor 100 using the electric field effect according to some embodiments of the present invention not only may have excellent accuracy and high sensitivity characteristics, but also may reduce a sensitivity deviation according to a temperature change. Furthermore, since the pressure sensor 100 suppresses moisture or water from penetrating between the first and second electrodes 110 and 130, noise phenomena, which may occur due to moisture or water, may be suppressed.

Figure 3A:
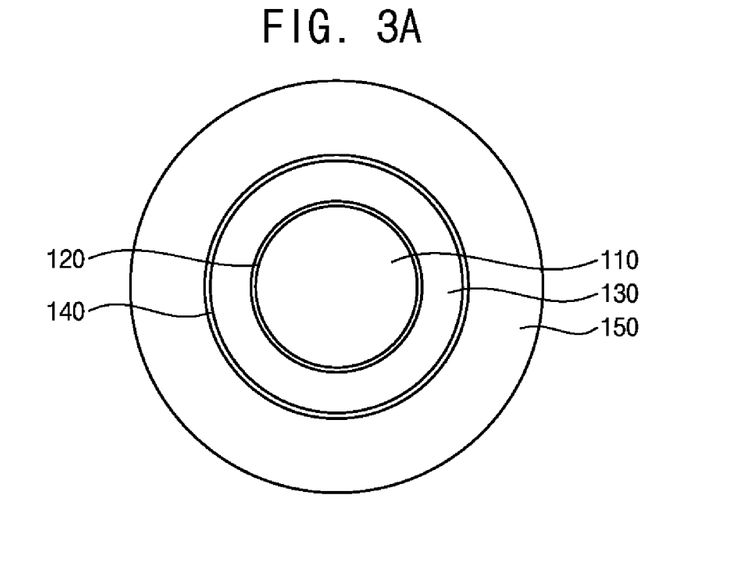
FIGS. 3A to 3C are plan views illustrating the electrodes of FIG. 1.
Figure 3B:
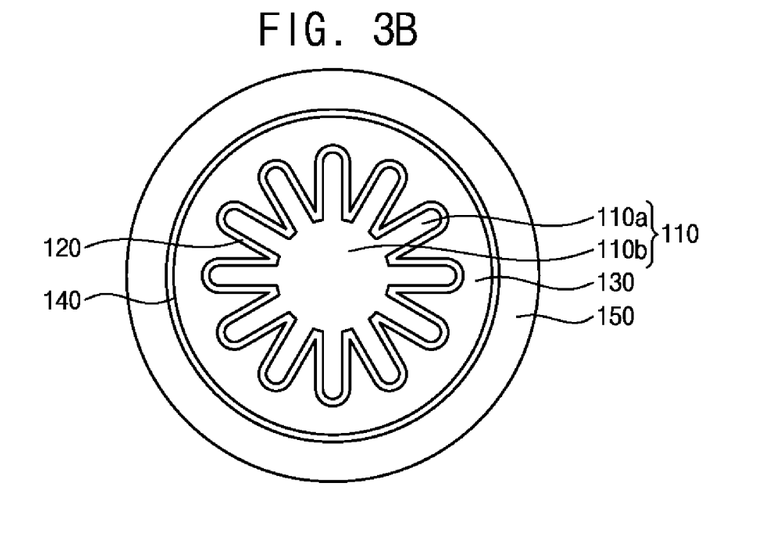
Figure 3C:
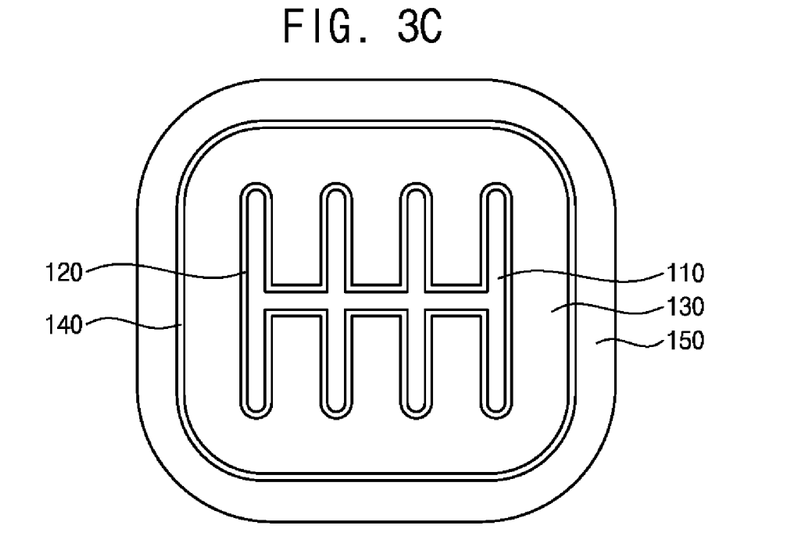

FIGS. 3A to 3C are plan views illustrating the electrodes of FIG. 1.

Referring to FIG. 3A, the first and second electrodes 110 and 130 and the ground electrode 150 may have a core cell structure. That is, the first electrode 110 may have a cylindrical shape, and the second electrode 130 and the ground electrode 150 may have a cylindrical shape having a hollow so as to surround the first electrode 110.

Referring to FIG. 3B, the first electrode 110 may include a central portion 110b and a plurality of extension portions 110a extending in a radial direction with respect to the central portion 110b.

Referring to FIG. 3C, the first electrode 110 may have a Chinese character "王" shape when viewed in a plan view.

Figure 4:
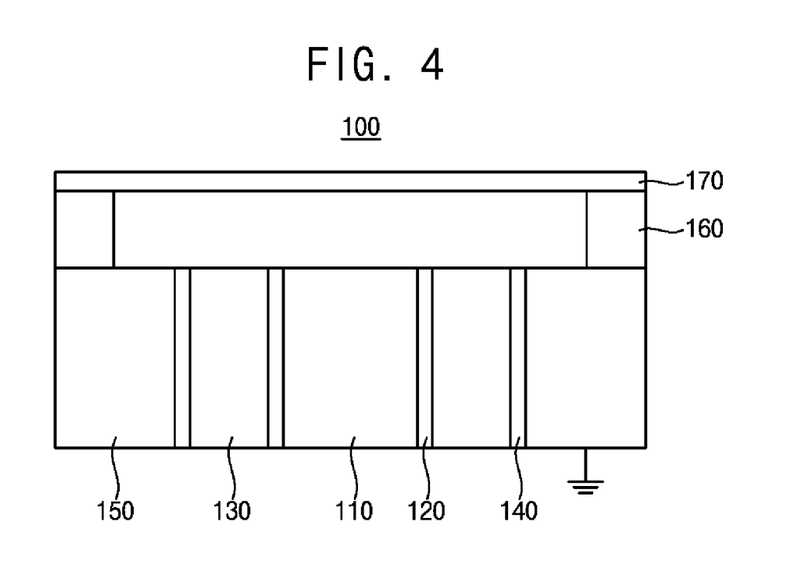
FIG. 4 is a cross-sectional view illustrating a pressure sensor using an electric field effect according to an example embodiment of the present invention.

FIG. 4 is a cross-sectional view illustrating a pressure sensor using an electric field effect according to an example embodiment of the present invention.

FIG. 4 is a cross-sectional view illustrating a pressure sensor using an electric field effect according to an example embodiment of the present invention. The pressure sensor using the electric field effect according to an example embodiment of the present invention is identical to the pressure sensor 100 described with reference to FIG. 1 except that the protrusion portion is replaced by the bonding portion 160, and thus the bonding portion will be described in detail.

Referring to FIG. 4, the pressure sensor 100 using the electric field effect according to an example embodiment of the present invention includes a first electrode 110, a second electrode 130, a first insulating layer 120, a ground electrode 150, a membrane 170 and a bonding portion 160.

The bonding portion 160 may define a hollow along an inner side of the bonding portion 160 by interconnecting a peripheral portion of the membrane 170 and the ground electrode 150. The bonding portion 160 may be formed through, for example, an electroplating process or a bonding process. That is, the bonding portion 160 may include an electroplating layer or a bonding layer.

Figure 5:
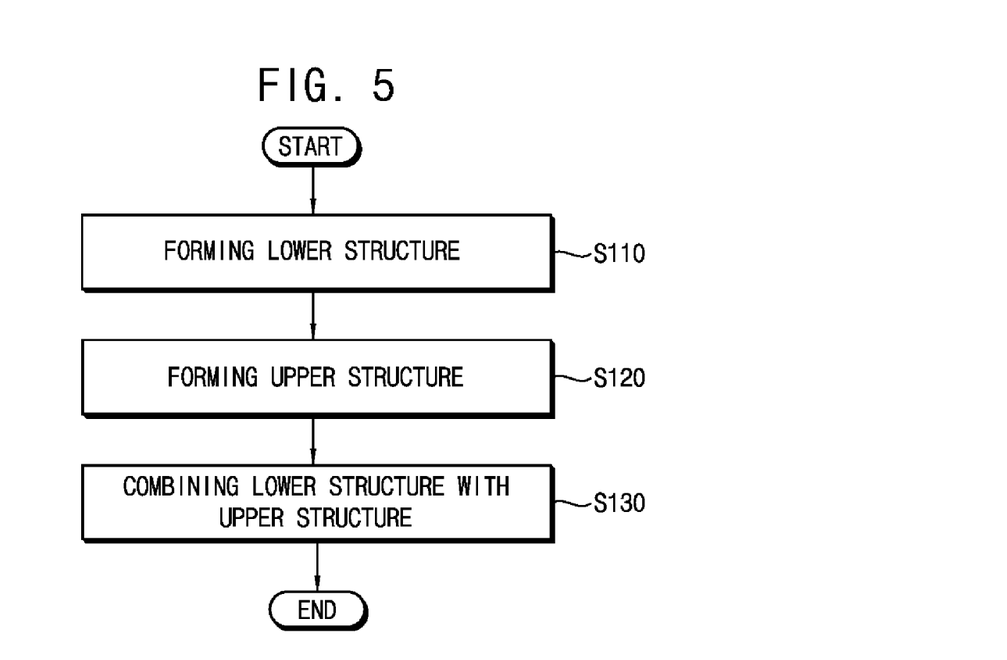
FIG. 5 is a flowchart illustrating a method of manufacturing a pressure sensor using an electric field effect according to an example embodiment of the present invention.

FIG. 5 is a flowchart illustrating a method of manufacturing a pressure sensor using an electric field effect according to an example embodiment of the present invention.

Referring to FIG. 5, in a method of manufacturing a pressure sensor using the electric field effect according to an example embodiment of the present invention, a lower structure is formed S110. The lower structure includes a first electrode, a second electrode, a first insulating layer and a ground electrode. A process of forming the lower structure will be described in detail with reference to FIGS. 6 to 8.

Figure 6:
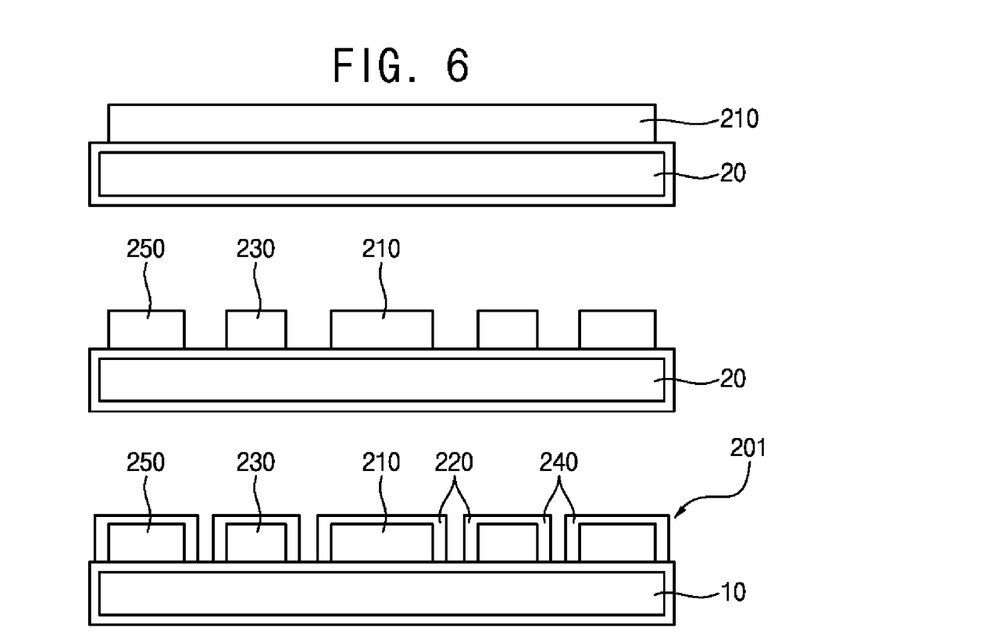
FIG. 6 is a plurality of cross-sectional views illustrating one example of a manufacturing process of the lower structure of FIG. 5.

FIG. 6 is a plurality of cross-sectional views illustrating one example of a manufacturing process of the lower structure of FIG. 5.

FIGS. 5 and 6, an epitaxial layer 210 is first formed on a substrate 20. The epitaxial layer 210 may be formed through an epitaxial growth process.

Subsequently, a photoresist pattern (not shown) is formed on the epitaxial layer 210. Then, an etching process using the photoresist pattern as an etching mask is performed to form epitaxial layer patterns 210, 230, and 250 on the substrate 20.

Each of the epitaxial layer patterns 210, 230, and 250 may function as an electrode pattern such as a first electrode, a second electrode, and a ground electrode. Hereinafter, a first electrode, a second electrode, and a ground electrode are denoted by reference numerals 210, 230 and 250, respectively. Thereafter, insulating layers 220 and 240 are formed to entirely cover the epitaxial layer patterns 210, 230 and 250. The insulating layers 220 and 240 may be formed through either an oxidation process or a deposition process for depositing silicon nitride.

Thus, the first insulating layer 220 is formed between the first electrode 210 and the second electrode 230, and the second insulating layer 240 is formed between the second electrode 230 and the ground electrode 250.

Figure 7:
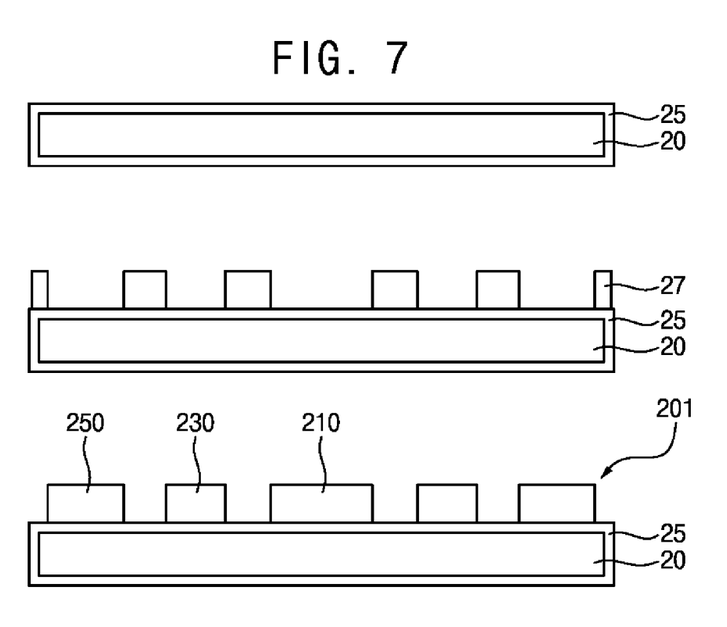
FIG. 7 is a plurality of cross-sectional views illustrating another example of a manufacturing process of the lower structure of FIG. 5.

FIG. 7 is a plurality of cross-sectional views illustrating another example of a manufacturing process of the lower structure of FIG. 5.

Referring to FIGS. 5 and 7, a metal layer 25 is formed on the substrate 20. Thereafter, a photoresist layer (not shown) is formed on the metal layer 25. Subsequently, the photoresist layer is patterned to form a photoresist layer pattern 27 partially exposing the metal layer. An electroplating process using the photoresist pattern 27 is performed to form electroplating layers 210, 230, and 250 on an exposed portion of the metal layer 25. The electroplating layers 210, 230 and 250 define a first electrode, a second electrode, and a ground electrode, respectively. Hereinafter, a first electrode, a second electrode, and a ground electrode are denoted by reference numerals 210, 230 and 250, respectively.

Thereafter, after removing the photoresist layer pattern from the metal layer, an insulating layer is formed to cover the electroplating layers. Thus, a lower structure is manufactured.

Figure 8:
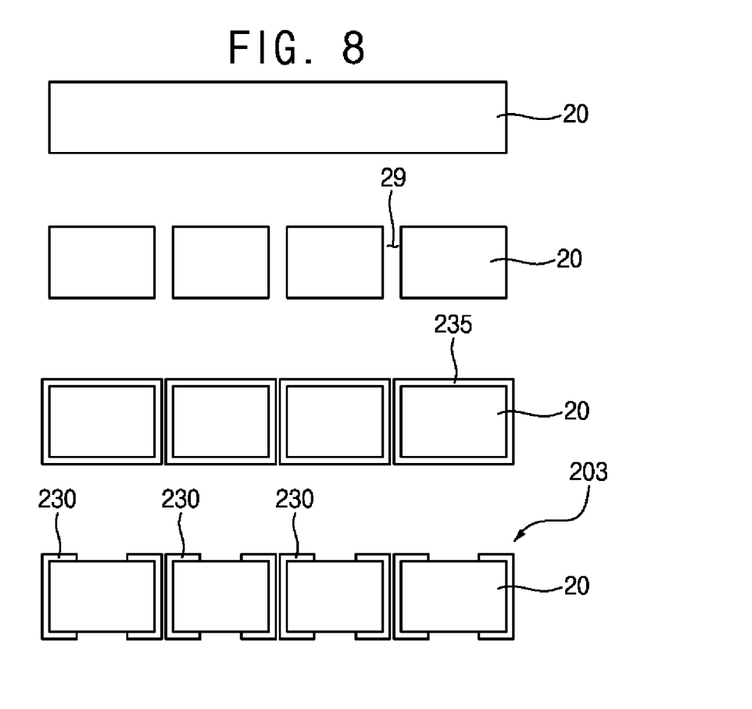
FIG. 8 is a plurality of cross-sectional views illustrating still another example of a manufacturing process of the lower structure of FIG. 5.

FIG. 8 is a plurality of cross-sectional views illustrating still another example of a manufacturing process of the lower structure of FIG. 5.

Referring to FIGS. 5 and 8, a plurality of via holes 29 of penetrating a substrate 20 is formed. The via holes 29 correspond to a positions for forming a first electrode, a second electrode, and a ground electrode.

Thereafter, a polysilicon layer 235 is formed to entirely surround the substrate 20 and a sidewall of each of the via holes 29. Then, the polysilicon layer 235 is patterned to form the polysilicon layer patterns 210, 230, and 250. That is, some of the polysilicon layer patterns 210, 230 and 250 buried in the via holes among the polysilicon layer patterns correspond to the first electrode, the second electrode, and the ground electrode, respectively. Subsequently, an insulating layer (not shown) is formed to cover the polysilicon layer patterns 210, 230, and 250 as a whole. Thereby, the lower structure is manufactured.

Referring to FIG. 5 again, an upper structure is formed S120. The upper structure is formed to include a membrane. The membrane is connected to the ground electrode and insulated from the first and second electrodes. The membrane may be formed through an anisotropic etching process or a plasma etching process on the polysilicon layer. Unlike these, the membrane may be formed through a welding process for a metal layer.

Subsequently, the upper structure and the lower structure are bonded to each other S130. Accordingly, a bonding portion is formed between the upper structure and the lower structure.

Figure 9:
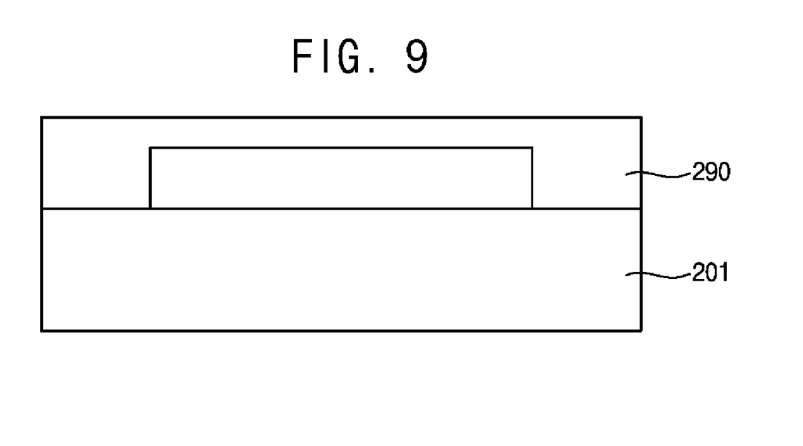
FIG. 9 is a cross-sectional view illustrating an example of a process of mutually combining the upper and lower structures of FIG. 5.

FIG. 9 is a cross-sectional view illustrating an example of a process of mutually coupling the upper and lower structures of FIG. 5.

Referring to FIGS. 5 and 9, the bonding portion may be formed through an anodic bonding process.

Figure 10:
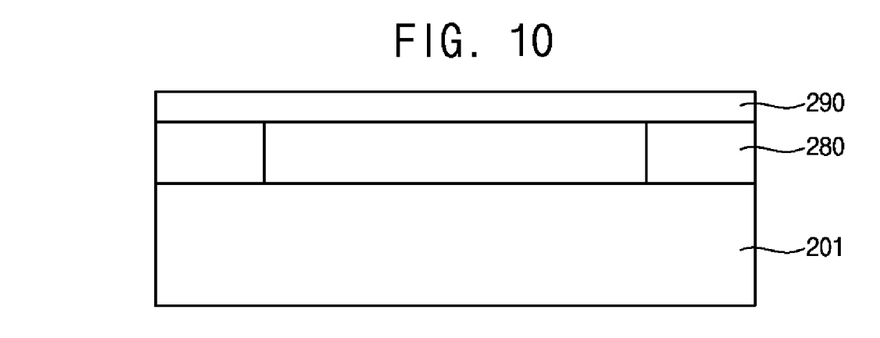
FIG. 10 is a cross-sectional view illustrating another example of a process of mutually combining the upper and lower structures of FIG. 5.

FIG. 10 is a cross-sectional view illustrating another example of a process of mutually coupling the upper and lower structures of FIG. 5.

Referring to FIGS. 5 and 10, the bonding portion may be formed through an adhesive bonding process.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of the present invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

INDUSTRIAL APPLICABILITY

In the above-described invention, the pressure sensor and the manufacturing method of the pressure sensor according to some embodiments of the present invention may be applied to a pressure sensor capable of detecting a pressure applied from the outside by using an electric field effect.

What is claimed is:

1. A pressure sensor using an electric field effect, the pressure sensor comprising:
    a first electrode extending in a vertical direction and defining a core region;
    a second electrode disposed to entirely surround the first electrode;
    a first insulating layer interposed between the first and second electrodes;
    a ground electrode electrically insulated from the second electrode, the ground electrode being disposed to surround the second electrode; and
    a membrane connected to the ground electrode and positioned to cover the first and second electrodes, and the membrane being provided to generate an electric field in an adjacent region together with the first and second electrodes, and being configured to make the electric field to distort when an object approaches thereto,
    wherein the ground electrode has a protrusion portion at an outermost portion thereof, and the protrusion portion has electric conductivity and is electrically connected to an outer periphery of the membrane.

2. The pressure sensor of claim 1, further comprising a second insulating layer interposed between the second electrode and the ground electrode.

3. The pressure sensor of claim 1, wherein the membrane includes silicon or metal.

4. The pressure sensor of claim 1, wherein the first and second electrodes and the ground electrode define a core shell structure.

5. The pressure sensor of claim 1, wherein the first electrode includes a central portion and a plurality of extension portions extending in a radial direction with respect to the central portion.

\* \* \* \* \*